United States Patent [19]

Addis et al.

[11] 3,906,344

[45] Sept. 16, 1975

[54] OSCILLOSCOPE HAVING SELECTABLE INPUT IMPEDANCES

[75] Inventors: John Lindsey Addis; Ronald Wayne Peltola, both of Portland, Oreg.

[73] Assignee: Tektronix, Inc., Beaverton, Oreg.

[22] Filed: Apr. 4, 1974

[21] Appl. No.: 457,888

Related U.S. Application Data

[63] Continuation-in-part of Ser. No. 228,196, Feb. 22, 1972, abandoned.

[52] U.S. Cl............... 324/121 R; 324/115; 324/128

[51] Int. Cl.$^{2}$.................... G01R 13/20; G01R 15/08

[58] Field of Search....... 324/128, 121 R, 115, 99 D

[56] References Cited

OTHER PUBLICATIONS

Tektronix Catalog, 1970, Tektronix, Inc., Beaverton, Oregon.

*Primary Examiner*—Alfred E. Smith
*Assistant Examiner*—Ernest F. Karlsen
*Attorney, Agent, or Firm*—Adrian J. La Rue

[57] ABSTRACT

An oscilloscope having both high and low input impedances is disclosed. The oscilloscope includes an input stage having a single input terminal selectably connected to either a low impedance attenuator or a high impedance attenuator section through an input switch. An output of the input stage including the two attenuator sections of different impedance is selectably connected to the common attenuator section and an amplifier circuit through a switch which is preferably operated simultaneously with the above-mentioned input switch.

5 Claims, 3 Drawing Figures

OSCILLOSCOPE HAVING SELECTABLE INPUT IMPEDANCES

This is a continuation of application Ser. No. 228,196, filed Feb. 22, 1972, now abandoned.

BACKGROUND OF THE INVENTION

For various applications, it is desirable that an input impedance of a measuring instrument such, for example, as an oscilloscope be high enough in order to reduce the loading effect upon the circuit points whose voltages are to be measured. However, the higher resistor that is employed for the input circuit of an oscilloscope as an input impedance establishing resistor, the greater the effect of capacitance distributed thereacross. As a result, the overall impedance of such resistor mainly depends upon the capacitance rather than the DC resistive value thereof at high frequencies. This causes signal distortion, especially for impulse signals including various frequency components. Moreover, the frequency bandwidth of such oscilloscope is limited by the following expression even if ideal amplifiers having infinite frequency bandwidth may be employed.

$$f_B = \frac{1}{2\pi} \cdot \frac{1}{C \cdot \frac{R1\ R2}{R1+R2}} \text{ (Hz)}$$

Where $f_B$ is the frequency bandwidth or the upper cutoff frequency of the oscilloscope, C is an input capacitance across the input terminal including the capacitor across the input resistor and stray capacitance, R1 is a source resistance of a signal source and R2 is the input resistor.

It is obvious from the above expression that the frequency bandwidth $f_B$ is counter proportional to the input capacitance C. This means that to employ a lower input resistor $R_2$ and to reduce the input capacitance C are primarily important to realize wide frequency bandwidth oscilloscope operation. In addition to the frequency bandwidth consideration, a low input resistance is necessary for measuring high speed signals because of constant circuit loading under wider frequency range.

Consequently, a high input impedance oscilloscope is used for high impedance and voltage signals and a low input impedance oscilloscope is used for high frequency signals. This means that two separate oscilloscopes are needed in order to measure all signals. In other words, many conventional oscilloscopes are not versatile enough to measure various signals different in frequency, frequency bandwidth, source impedance and the like. It is not only uneconomical but also inconvenient. Even if the input circuit of the high impedance attenuator may selectably be shunted with a low impedance, the frequency bandwidth of the oscilloscope does not improve significantly because of the large effectively lumped capacitance of the high impedance attenuator.

SUMMARY OF THE INVENTION

According to the present invention, both high and low impedance input attenuator sections are ganged together to a single control shaft and are selectable by a simple operation. Thus, an oscilloscope using the present invention can be utilized in either high impedance or low impedance mode according to the input signal conditions without employing two different oscilloscopes. This, in turn, changes the frequency bandwidth. Moreover, as the output attenuator section is commonly utilized for both high and low impedance circuits, the circuit is less complicated, less expensive and easy to operate.

It is therefore one object of the present invention to provide an improved oscilloscope having selectable input impedances.

It is another object of the present invention to provide an improved oscilloscope whose input impedance and frequency bandwidth characteristics are selectable while the deflection sensitivity remains unchanged.

It is still another object of the present invention to provide a more versatile oscilloscope to be applicable to various input signals different in frequency, frequency bandwidth, source impedance and the like.

It is yet another object of the present invention to provide an improved oscilloscope having selectable input impedance and frequency bandwidth characteristics, wherein two input attenuator stages of different input impedances are provided, and the input connector and the output attenuator section are commonly used for both high and low impedance circuits.

The subject matter of the present invention together with the organization, method of operation and further advantages will best be understood from the following description made by reference to the accompanying drawings, wherein similar characters refer to like elements.

DETAILED DESCRIPTION OF PREFERRED EMBODIMENT

The detailed description of the preferred embodiment of the present invention will be given hereinafter by reference to the accompanying drawings.

Figure 1:
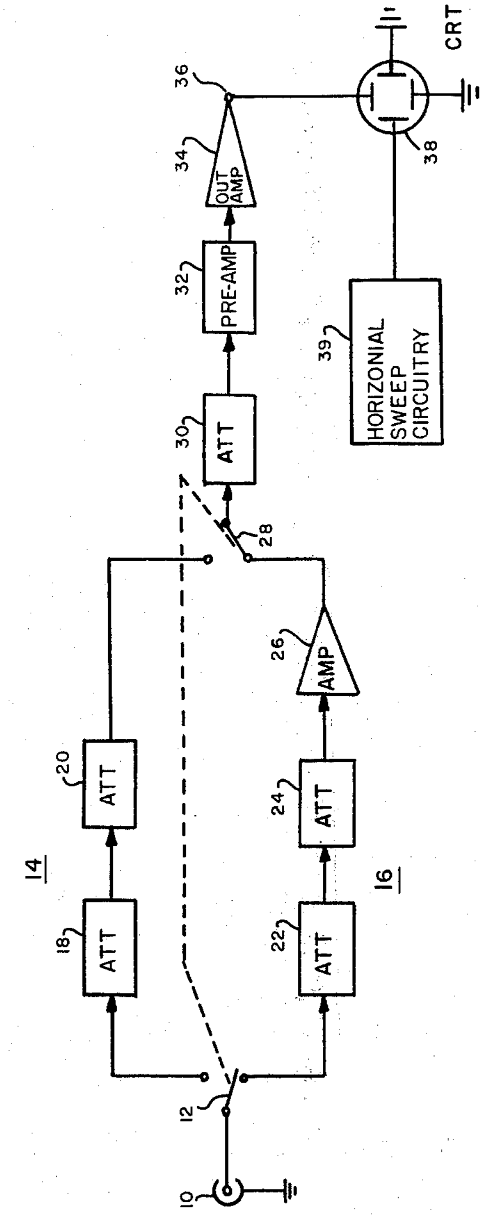
FIG. 1 is a block diagram of an important portion of an oscilloscope according to the present invention.

FIG. 1 illustrates a block diagram of an important portion of an oscilloscope according to the present invention. In FIG. 1, an input connector 10, suitably a BNC type, is provided to receive an input signal from a signal source whose voltage is to be measured by the oscilloscope. The input connector 10 is then connected to the common terminal of a double throw input switch 12 whose pair of fixed terminals are respectively connected to a low impedance input attenuator section 14 and to a high impedance input attenuator section 16. The low impedance input attenuator section 14 may include, for example, a pair of similar attenuators 18 and 20 each having the attenuation factor of ten. The attenuators 18 and 20 have, for example, 50 ohm DC input resistance. On the other hand, the high impedance input attenuator section 16 includes, for example, a pair of similar attenuators 22 and 24, each having the attenuation factor of 10 and also an amplifier 26 having a terminated gain of unity. The DC input resistance of the attenuators 22 and 24 is selected at a high value such, for example, as 1 megohm. The unity gain amplifier 26 or the impedance converter has the same input resistance as that of the attenuators 22 and 24.

The outputs from the input attenuator sections 14 and 16 are connected to a pair of fixed terminals of an output switch 28. The common or movable terminal of the output switch 28 is connected to a vertical deflection circuit for a cathode ray tube 38 through an attenuator 30, a preamplifier 32, an output amplifier 34 and a terminal 36. The output from output terminal 36 is connected to one of the vertical deflection plates of a cathode ray tube 38 of an oscilloscope while the other vertical deflection plate is connected to ground. The horizontal deflection plates are connected to appropriate conventional sweep circuitry 39 for sweeping the electron beam across the cathode ray tube 38 in a known manner. Both input and output switches 12 and 28 are preferably ganged together by either electrical or mechanical coupling means so that the movable terminal of the output switch 28 is connected to the output of the low impedance input attenuator section 14 when the movable terminal of the input switch 12 is selected to the low input attenuator section 14 and vice versa. The switch 12 can be a miniaturized electrical relay switch whose actuating coil is energized by the switching operation of the output switch 28. The output switch 28 may be a cam-actuated push button switch having selectively illumination means as taught by U.S. Pat. No. 3,584,174. Any conventional switches other than the above may be utilized for the input and output switches 12 and 28, however the excess inductive and capacitive components thereof should be as small as possible because they are interposed directly in the high frequency signal path.

Although the output attenuator section 30 is shown by a single block, the attenuation factor thereof can be selected by the same control shaft as the input attenuators 14 and 16, for example, either 1, 2 or 5. As a result, the attenuation factor of the input and output attenuating sections 14, 16 and 30 can be selected in 1, 2, 5, 10, 20, 50 and so on in a sequential manner. Thus, the oscilloscope provides different deflection factors by selecting such input and output attenuator sections 14, 16 and 30. Because of the unity gain of amplifier 26, the output attenuator 30 provides the same attenuation factor on both input signals from either low impedance attenuator section 14 or high impedance attenuator section 16.

Although it is not shown in FIG. 1, the oscilloscope according to the present invention includes a conventional horizontal circuit for generating a ramp signal synchronizing with the input signal. A trigger signal for triggering the horizontal circuit may be derived from the preamplifier 32. Each circuit component except the vertical output and horizontal circuits will be discussed hereinafter in greater detail by reference to FIGS. 2A and 2B.

Figure 2A:
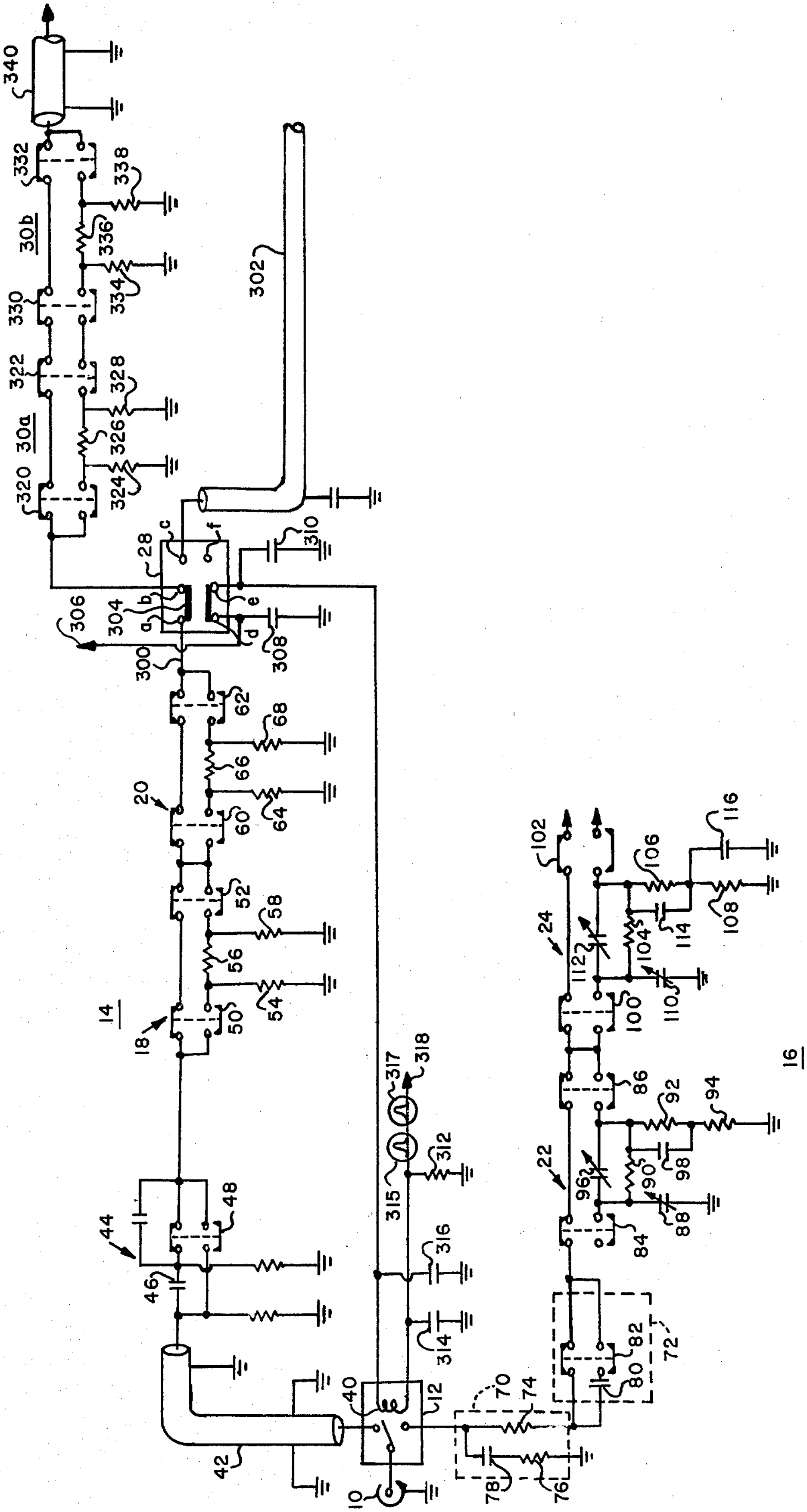
FIG. 2A is a circuit diagram of one part of the block diagram in FIG. 1.

FIG. 2A illustrates a circuit diagram of one embodiment of the present invention wherein similar characters refer to like elements. The inner conductor of the input connector 10 is connected to the movable terminal of the input switch 12 which is a relay switch including an actuating coil 40. One fixed terminal of the relay switch 12 is connected to the low impedance input attenuator section 14 through a coaxial cable 42 and an input coupling circuit 44. The input coupling circuit 44 includes a capacitor 46 and a switch 48 which selects the coupling mode of the input signal applied to the input connector 10 to the low impedance attenuator section 14 either by DC coupling or AC coupling.

When the switch 48 is pushed down, the input signal is transmitted to the attenuator 18 through the capacitor 46. Thus, an AC coupling is realized. The coupling capacitor 46 has a large capacitive value of, for example, 2.2 uf so that even low frequency components of the input signal will be transferred therethrough without considerable attenuation. When the switch 48 is pulled up, the inner conductor of the coaxial cable 42 is directly connected to the input attenuator 18 to realize a DC coupling mode.

The input attenuator section 14 includes a pair of selectable attenuators 18 and 20. The attenuator 18 consists of an input switch 50, an output switch 52 and resistors 54,56 and 58. Similarly, the attenuator 20 consists of input and output switches 60 and 62 and resistors 64, 66 and 68. The input and output switches 50 and 52 are operated simultaneously. By pushing down or pulling up the input and output switches 50 and 52, the attenuation factor of the attenuator 18 is selected either as one or 10 because the resistors 54, 56 and 58 are selected such that the resistive network forms an attenuator of an attenuation factor of 10. The input impedance of the attenuator 18 or the impedance between the common junction of the resistors 54 and 56 and ground is 50 ohms. It is obvious for those skilled in the art that the resistors 54 and 58 should be approximately 61 ohms and the resistor 56 is approximately 247.5 ohms in order to form an attenuator having an attenuation factor of ten and 50 ohm input and output impedances. The attenuator 20 is identical to the attenuator 18 described above. Accordingly, the overall attenuation factor of the low impedance input attenuator section 14 can be selected either as one, ten or hundred by selectively operating the switches 50, 52, 60 and 62 of the attenuators 18 and 20.

The other fixed terminal of the input switch 12 is connected to the high impedance input attenuator section 16 through a network 70 and an input coupling circuit 72 similar to the coupling circuit 44. The network 70 includes resistors 74 and 76 and a capacitor 78. This resistor 76 and capacitor 78 of the network 70 together with the input resistance and capacitance of the high impedance input attenuator section 16 provides a proper input impedance characteristic or a loading characteristic for an input signal source connected to the input connector 10. The input coupling circuit 72 selects the input coupling mode as either an AC or DC coupling mode. The input circuit 72 includes a capacitor 80 and a switch 82. When the switch 82 is pushed down, the DC coupling mode is selected and the input signal applied to the connector 10 is directly transmitted to the high impedance input attenuator section 16. On the other hand, the coupling capacitor 80 is interposed therebetween when the switch 82 is pulled up.

The high impedance attenuator 22 consists of input and output switches 84 and 86 and a high impedance attenuator network including resistors 90, 92 and 94 and capacitors 88, 96 and 98. The resistor 90 has a resistive value of 900 kilohm and the resistors 92 and 94 have, in total a resistive value of approximately 111 kilohm for forming an attenuator whose attenuation factor and input resistance are respectively ten and one megohm. The capacitors 96 and 98 are provided for frequency compensation so that the attenuation factor of the attenuator 22 will be maintained at a fixed value or 10 over a wider frequency bandwidth. The variable capacitor 88 is provided to adjust the input capacitance of the high impedance attenuator section 16 to a predetermined value. The input and output switches 84 and 86 are operated simultaneously to select either a one or ten attenuation factor. Similarly, the attenuator 24 includes input and output switches 100 and 102 and a high impedance attenuator network including resistors 104, 106 and 108 and capacitors 110, 112, 114 and 116. It is also true that the attenuation factor of the attenuators 22 and 24 can be selected either as one or 10 by switching the input and output switches 84, 86, 100 and 102. Thus, the attenuation factor of the high impedance input attenuator section 16 can be selected either as one, 10 or 100. The variable capacitors 88 and 110 are adjusted such that the overall capacitances of the attenuators 22 and 24 will be a predetermined value.

Figure 2B:
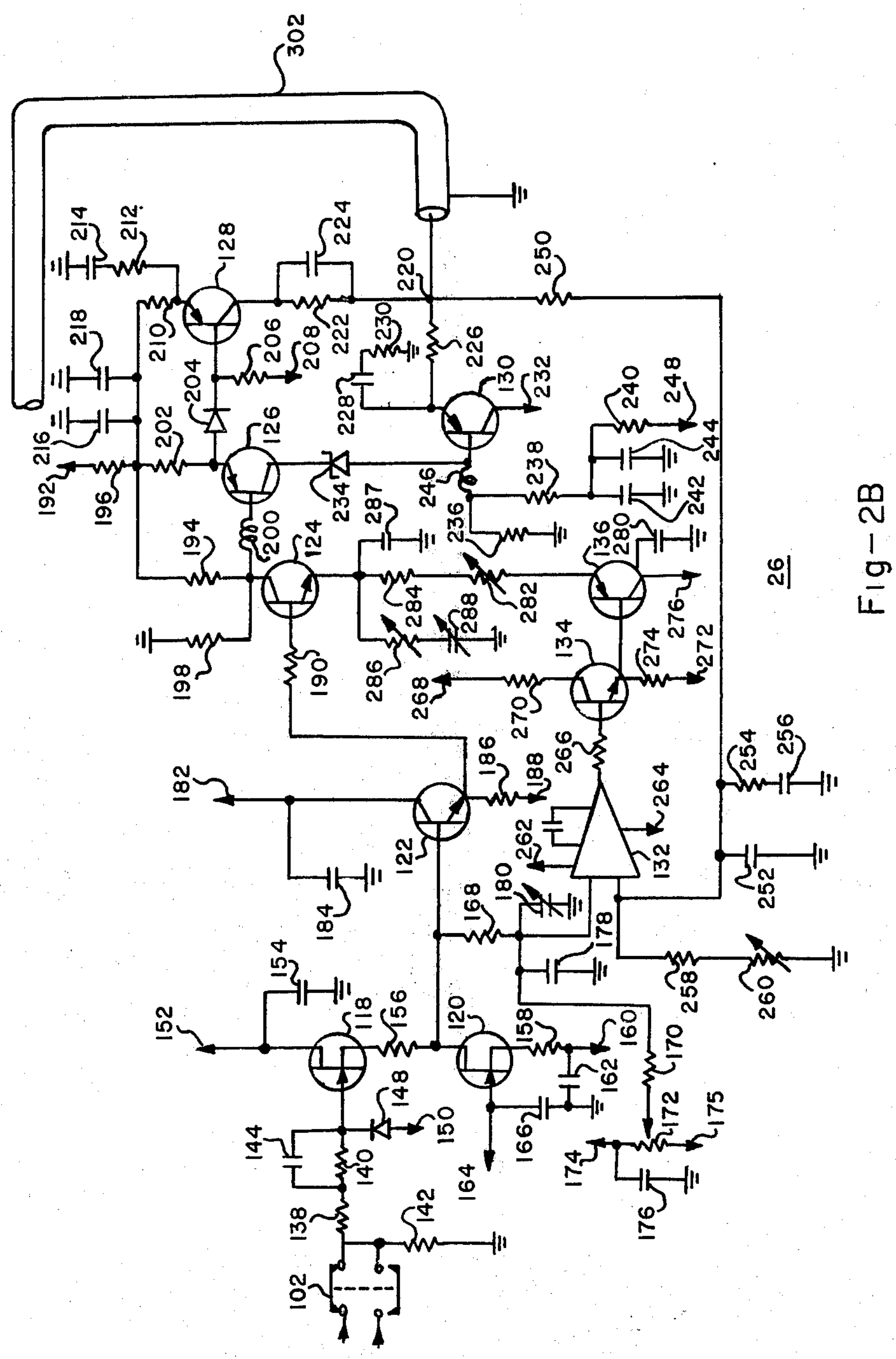
FIG. 2B is a circuit diagram of the other part of the block diagram of FIG. 1.

The unity gain amplifier 26 as illustrated in FIG. 2B consists of a source follower field effect transistor input stage including field effect transistors 118 and 120, a main amplifier stage including transistors 122, 124, 126, 128 and 130 and a feedback stage including a differential amplifier block 132 and transistors 134 and 136. The output of the attenuator 24 is connected to the gate of a source follower input field effect transistor amplifier through resistors 138 and 140. The output of the attenuator 24 is also returned to ground through a high value resistor 142 whose resistive value is substantially equal to the input resistance of the attenuators 22 and 24 or 1 megohm. A speed up capacitor 144 is connected across the resistor 140. An input voltage overload protection circuit for the field effect transistor 118 is provided to the gate thereof, which includes a reverse biased diode 148 connected to a suitable negative voltage source 150.

The drain of field effect transistor 118 is connected to a suitable voltage source 152 and is returned to ground through a capacitor 154. The source is coupled to the drain of field effect transistor 120 through a resistor 156. The source of field effect transistor 120 is then returned to a suitable negative voltage source 160 through a resistor 158. The negative voltage source 160 is decoupled via capacitor 162. The gate of field effect transistor 120 is connected to a suitable negative voltage source 164 which is returned to ground through a capacitor 166. As the gate voltage of field effect transistor 120 is maintained at a constant voltage, field effect transistor 120 operates as a constant current source.

The drain of field effect transistor 120 is connected to the base of transistor 122 and is connected to one input of the differential amplifier 132 through a resistor 168. The one input terminal of the differential amplifier 132 is connected to a movable tap of a potentiometer 172 whose fixed terminals are connected to suitable positive and negative voltage sources 174 and 175 respectively through a resistor 170. One fixed terminal of the potentiometer 172 which is connected to the positive voltage source 174 is returned to ground through a capacitor 176. The one input terminal of the differential amplifier 132 is also returned to ground through a pair of capacitors 178 and 180. The potentiometer 172 controls the quiescent output voltage of the unity gain amplifier 26.

The collector of the transistor 122 is connected to a suitable voltage source 182 and a capacitor 184 which is connected to ground. The emitter of the transistor 122 is connected to the base of the transistor 124 through a resistor 190 and is returned to a negative voltage source 188 through a resistor 186. The collector of the transistor 124 is coupled to a suitable positive voltage source 192 through a pair of resistors 194 and 196. The collector of the transistor 124 is also connected to the base of the transistor 126 and ground through, respectively, an inductor 200 and a resistor 198. The emitter of the transistor 126 is connected to the common junction of the resistors 194 and 196 through a resistor 202 and to the base of transistor 128 through diode 204. The base of transistor 128 is connected to a suitable negative bias voltage source 208 through a resistor 206 for applying base bias thereto. The emitter of the transistor 128 is connected to the common junction of resistors 194, 196 and 202 through a resistor 210 and to ground through serially-connected resistor 212 and capacitor 214. The common junction of resistors 194, 196, 202 and 210 is returned to ground through capacitors 216 and 218. The collector of the transistor 128 is connected to an output terminal 220 through a parallel combination of a resistor 222 and a capacitor 224.

The output terminal 220 is connected to the emitter of transistor 130 through a resistor 226. The emitter of transistor 130 is also returned to ground through serially-connected capacitor 228 and resistor 230. The collector thereof is returned to a suitable negative voltage source 232, and the base is connected to the collector of transistor 126 through a Zener diode 234. The base bias is provided from a network including resistors 236, 238 and 240, capacitors 242 and 244, an inductor 246 and a suitable negative voltage source 248. The output impedance of the amplifier 26 is primarily determined by the resistor 226, which is substantially the same resistive value as the input and output resistances of the low impedance input attenuators 18 and 20 and by resistor 230 and capacitor 228.

The output terminal 220 is also connected to another input of the differential amplifier block 132 through a resistor 250. A capacitor 252, serially-connected resistor 254 and capacitor 256 and serially-connected resistors 258 and 260 are returned to ground from the other input terminal of differential amplifier 132. The variable resistor 260 controls the DC gain of the unity gain amplifier 26 because the resistor 260 determines the feedback ratio. The resistor 254 and capacitors 252 and 256 are provided for high frequency compensation.

A positive voltage source 262 and a negative voltage source 264 are supplied to the differential amplifier block 132. The output from the differential amplifier block 132 is connected to the base of the emitter follower transistor 134 through a resistor 266. The collector of the transistor 134 is connected to a suitable voltage source 268 via a resistor 270, and the emitter thereof is connected to a suitable negative voltage source 272 via a load resistor 274. The base of the transistor 136 is connected to the emitter of transistor 134. The collector thereof is connected to a suitable negative voltage source 276 to ground by a capacitor 280. The emitter of the transistor 136 is coupled with the emitter of the transistor 124 through resistors 282 and 284. The emitter of the transistor 124 is returned to ground through serially-connected resistor 286 and capacitor 288 and through capacitor 287. The capacitor 288 and the resistors 282 and 286 control the AC gain of the unity gain amplifier 26, while the resistor 260 adjusts the DC gain of the unity gain amplifier 26.

The outputs from the attenuator 20 and the unity gain amplifier 26 are connected to the output switch 28 via a line 300 and a coaxial cable 302. The output switch 28 has six terminals *a*, *b*, *c*, *d*, *e* and *f*. The output from the attenuator 20 is connected to the terminal *a* and the output from the unity gain amplifier 26 is connected to the terminal *c*. The terminal *d* is connected to a suitable voltage source 306 and to ground via a capacitor 308. The terminal *e* is connected to one terminal of an actuating coil 40 of the relay switch 12 as well as to ground through a capacitor 310. The other terminal of the actuating coil 40 is returned to ground through a resistor 312. Across the terminals of the actuating coil 40, a pair of capacitors 314 and 316 are connected, and the common junction thereof is returned to ground. The terminal *b* of the output switch 28 is connected to the common attenuator section 30.

When the movable terminals 304 are moved to the left position, terminals *a* and *b* and terminals *d* and *e* are connected together. Thus, the current flowing through actuating coil 40 and resistor 312 from voltage source 306 actuates input switch 12 such that input connector 10 is connected to low impedance input attenuator 14. Moreover, output switch 28 is also connected such that the output of the attenuator 20 is connected to common output attenuator 30. The voltage across the resistor 312 may be utilized to control indicator lamps 315 and 317 through a terminal 318 such that indicators bearing "1 megohm" and "50 ohms" will be illuminated accordingly. On the other hand, the output from high impedance input attenuator section 16 will be connected to the common output attenuator section 30 when the movable terminal 304 is moved to the right position whereby terminals *b* and *c* and terminals *e* and *f* are connected.

The common output attenuator 30 consists of a pair of attenuators 30*a* and 30*b* whose attenuation factors are 2 and 2.5 respectively. The attenuator 30*a* includes input and output switches 320 and 322 and an attenuator network having resistors 324, 326 and 328. If the input and output impedances of the attenuators 30*a* are 50 ohms, the resistance value of the resistors 324 and 328 should be 150 ohms and the resistor 326 should be 37.5 ohms. Similarly, the attenuator 30*b* includes input and output switches 330 and 332 and an attenuator network of 50 ohm input and output impedances having resistors 334, 336 and 338. The resistance values of the resistors 334, 336 and 338 should be 116 2/3, 50.25 and 116 2/3 ohms respectively. The output of the attenuator 30 is connected to the preamplifier 32 through a coaxial cable 340 having a uniform characteristic impedance of 50 ohms.

Although not described in detail, the switches 48, 50, 52, 60, 62, 82, 84, 86, 100, 102, 320 and 322 which are utilized for the input coupling circuits 44 and 72 and the attenuators 18, 20, 22, 24 and 30 may be any conventional push-button, slide or rotary type switches. However, it is preferable to employ a drum switch having a plurality of spring contacts on an etched circuit board and a single drum of plastic material having a plurality of programmed projections along the surface of the drum such that the projections will actuate the spring contacts. (See U.S. Pat. No. 3,562,464 and Ser. No. 114,273 filed Feb. 10, 1971, both assigned to Tektronix, Inc.) Such a drum switch requires a minimum number of leads to other circuit components. Thus, stray reactances, especially stray capacitance, will be reduced significantly, and the entire dimension of such switch structure will also be minimized.

According to one example of the present invention, the frequency bandwidth will be 350 MHz when the 50 ohm input impedance is selected and 250 MHz when the 1 megohm input impedance is selected. Thus, a high frequency input signal may suitably be measured by the 50 ohm input impedance. If the input amplitude is large enough, an electrical probe having an attenuation ratio of 10, for example, may be utilized in order to increase the input impedance or to reduce the loading effect and signal amplitude. As it will be understood from the above description, the present invention has various advantages over the conventional oscilloscopes such as, for example, versatility in being capable of selecting different modes only by operating a single switch and simplicity in both circuit construction and operation. In addition to the above advantages, the present invention does not require many additional circuit components because only one part of the attenuator stage and impedance converting amplifier are added to the conventional oscilloscope.

Although one embodiment of the present invention is described in the above description, various modifications can be made without departing from the spirit and scope of the present invention. For example, if it is desirable for some applications, more than two attenuators having different input impedances may be employed in a single oscilloscope mainframe.

What is claimed is:

1. An oscilloscope, comprising:

a cathode-ray tube including vertical and horizontal deflection means for orthogonally deflecting the electron beam, vertical amplifier means for amplifying the input signal applied thereto and for driving said vertical deflection means, horizontal circuit means for generating sweep signals for driving said horizontal deflection means, a single input terminal, attenuator means including a plurality of selectable attenuators of different input impedance, wherein the impedance selected remains substantially constant over the attenuation range, and switch means operated by single operating means for connecting a selected attenuator to said input terminal and to the input of said vertical amplifier and at the same time disconnecting other attenuators from said input terminal and said input of said vertical amplifier, said switch means and said attenuator means being housed together in a single unitary structure.

2. An oscilloscope according to claim 1, wherein one portion of said attenuator means is common for all of said attenuators of different input impedance.

3. An oscilloscope according to claim 2, wherein the input impedance of said common attenuator portion is selected to the same input impedance as one of said plurality of attenuators, and impedance converting means are employed for said plurality of attenuators except said one.

4. An oscilloscope according to claim 1, wherein either one of said switches is a relay switch which is electrically actuated upon operating the other switch.

5. An oscilloscope according to claim 1, wherein indicator means is provided to indicate the impedance of said selected attenuator.

* * * * *

UNITED STATES PATENT OFFICE
CERTIFICATE OF CORRECTION

PATENT NO. : 3,906,344

DATED : September 16, 1975

INVENTOR(S) : JOHN LINDSEY ADDIS ET AL

It is certified that error appears in the above-identified patent and that said Letters Patent are hereby corrected as shown below:

Column 1, Line 25, "$f_B = \frac{1}{2\pi} \cdot \begin{array}{c} 1 \\ C\;\underline{R1\;R2} \\ \qquad R1+R2 \end{array}$ (Hz)"

should be --$f_B = \frac{1}{2\pi} \cdot \frac{1}{C\;\frac{R1\;R2}{R1+R2}}$ (Hz)--

Column 4, Line 48, "input circuit" should be --input coupling circuit--

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*